United States Patent [19]

Crossland et al.

[11] Patent Number: 4,701,029

[45] Date of Patent: Oct. 20, 1987

[54] LASER ADDRESSED SMECTIC DISPLAYS

[75] Inventors: William A. Crossland; Christopher J. J. Walker, both of Harlow; Anthony B. Davey, Bishops Stortford, all of England

[73] Assignee: Standard Telephones and Cables Public Limited Company, London, England

[21] Appl. No.: 753,444

[22] Filed: Jul. 10, 1985

[30] Foreign Application Priority Data

Jul. 17, 1984 [GB] United Kingdom ............... 8418120

[51] Int. Cl.$^4$ ............................................ G02F 1/137
[52] U.S. Cl. .................................. 350/351; 350/350 S
[58] Field of Search ............................. 350/351, 350 S

[56] References Cited

U.S. PATENT DOCUMENTS

| | | | |
|---|---|---|---|
| 3,796,999 | 3/1974 | Kahn | 350/351 |
| 4,040,047 | 8/1977 | Hareng et al. | 350/351 |
| 4,419,664 | 12/1983 | Crossland et al. | 350/350 S |
| 4,507,221 | 3/1985 | Imazeki et al. | |

FOREIGN PATENT DOCUMENTS 2093206 8/1982 United Kingdom .

OTHER PUBLICATIONS

Sasaki et al, "Laser-Addressed Smectic-Cholesteric Light valve Doped with Dichroic Dye", Proceedings of the Sid, vol. 25, No. 2, 1984, pp. 95-98.

Kahn, F. J., "IR-Laser-Addressed Thermo-Optic Smectic Liquid-Crystal Storage Displays," Applied Physics Letters, vol. 22, No. 3, Feb. 1, 1973, pp. 111-113.

Lu, et al, "Thermally and Electrically Addressed Dye Switching LCDs," Mol. Cryst. Liq. Cryst., vol. 94, 1983, pp. 167-189.

Armitage, "Numerical Solution of Heat Flow in the Laser Addressed Liquid-Crystal Display," J. Appl. Phys, vol. 52, No. 7, Jul., 1981, pp. 4843-4851.

C. J. Walker and W. A. Crossland, "Smectic Dynamic Scattering in Laser-Addressed Liquid Crystal Projection Displays", Displays, Oct. 1985, pp. 207-211.

*Primary Examiner*—John K. Corbin
*Assistant Examiner*—Martin Lerner
*Attorney, Agent, or Firm*—Kerkam, Stowell, Kondracki & Clarke

[57] ABSTRACT

A laser beam addressed smectic display in which the laser beam is used to write clear tracks in an optically scattering field employs an anisotropic conductivity dopant in the liquid crystal filling so that the cell can be electrically set into the scattering state by means of dynamic scattering effects. This requires the use of a laser light absorbing dye that is not only photochemically stable, but also stable against the effects of the relatively high fields and currents present when the cell is being set into the scattering state.

2 Claims, 3 Drawing Figures

LASER ADDRESSED SMECTIC DISPLAYS

BACKGROUND TO THE INVENTION

This invention relates to laser beam addressed smectic displays and their manner of operation, and is particularly concerned with displays of this type that are suited for direct projection whereby lines written into the display by the laser beam project as bright lines set against a dark background.

If a homeotropically surface aligned liquid crystal cell containing a filling that exists in a smectic phase exhibiting positive dielectric anisotropy is, in the absence of any applied electric field, slowly cooled from a temperature at which the filling exists in the isotropic liquid phase to a temperature at which it exists in the smectic phase, then the visual clarity of the liquid in the isotropic phase is preserved when it enters the smectic phase. If however, the cooling is sufficiently rapid it is found that the rapid quenching of the random orientation of the molecules in the isotropic phase gives rise to the formation of focal-conic domains in the smectic phase, and those domains are light scattering.

This effect can be used to create a laser beam written display in which the whole cell is subjected to a relatively slow thermal excursion into the isotropic phase and back into the smectic phase in order to erase the cell, rendering it clear so as to be ready for the entry of data. The data is entered by tracking a laser beam over the surface of the display which is arranged to absorb the incident light and thus produce sharply localised heating. Movement of the beam across the surface is arranged to be sufficiently rapid to produce the rapid cooling necessary for the production of focal-conic scattering domains. In this way light-scattering tracks are written which contrast with a clear background. A conventional projection system will project these as dark lines set aqainst a bright background. This is the wrong way round for an overlay projection system in which the projection system is to be used to add the information content of the liquid crystal display as an overlay to an existing display. For an overlay projection system the information needs to be projected in the form of bright lines set against a dark background. Reverse Schlieren optics can be used to convert the scattering tracks into this format, but such an optical system is very wasteful of light.

Clear tracks can be written into a field which has previously been set into a scattering state by traversing the laser beam whilst maintaining an alternating electric potential across the thickness of the layer. The frequency of this alternating potential needs to be above a certain threshold value beneath which ion migration effects will tend to reinforce scattering rather than extinguish it by inducing homeotropic alignment. The magnitude of the resulting field must be somewhat less than the threshold value which will restore homeotropic alignment in the absence of the thermal in pulse provided by the laser beam.

The practical implementation of this method of laser beam writing of clear tracks in a scattering field requires a satisfactory method of setting the field into the scattering state in the first instance. In principle this scattering state could be produced by scanning the laser beam over the whole display area in the absence of any applied field, but this is too time consuming to be practical for most applications.

An alternative method, which is the subject of our Patent Specification No. 2093206A, is to illuminate the whole display area with a short duration flash of intense light, for instance from a xenon flash, which is absorbed and thus produces the requisite short duration heating pulse. One of the problems with this approach is the difficulties encountered in obtaining acceptable uniformity illumination, and hence of scattering density.

The present invention is concerned with an alternative approach which involves modifying the filling of the cell by the incorporation of a dopant that provides it with an anisotropic conductivity suitable for inducing dynamic scattering within the liquid crystal layer so that it can be set into a scattering state by the application of an electric field.

SUMMARY OF THE INVENTION

According to the present invention there is provided a method of operating a laser beam scanned smectic cell to produce scattering texture data set against a substantially non-scattering clear background, wherein an entire area of the liquid crystal layer of the cell is 'erased' by setting it into a scattering state, and wherein data is subsequently entered on the erased area by the creation of substantially non-scattering clear regions produced by scanning the laser beam across selected portions of the erased area to produce localised heating into the isotropic phase by absorption of the laser light by a guest dye followed by rapid cooling characterised in that the setting into a scattering state is achieved by temporarily inducing dynamic scattering and in that the rapid cooling is in the presence of an alternating electric field applied across the thickness of the layer that is too high in frequency to produce dynamic scattering and is insufficient in amplitude to switch regions of the area not subject to the laser beam induced thermal excursion.

BRIEF DESCRIPTION OF THE DRAWINGS

There follows a description of a display device and its manner of operation embodying the invention in a preferred form. The description refers to the accompanying drawings in which.

DETAILED DESCRIPTION OF PREFERRED EMBODIMENT

Figure 1:
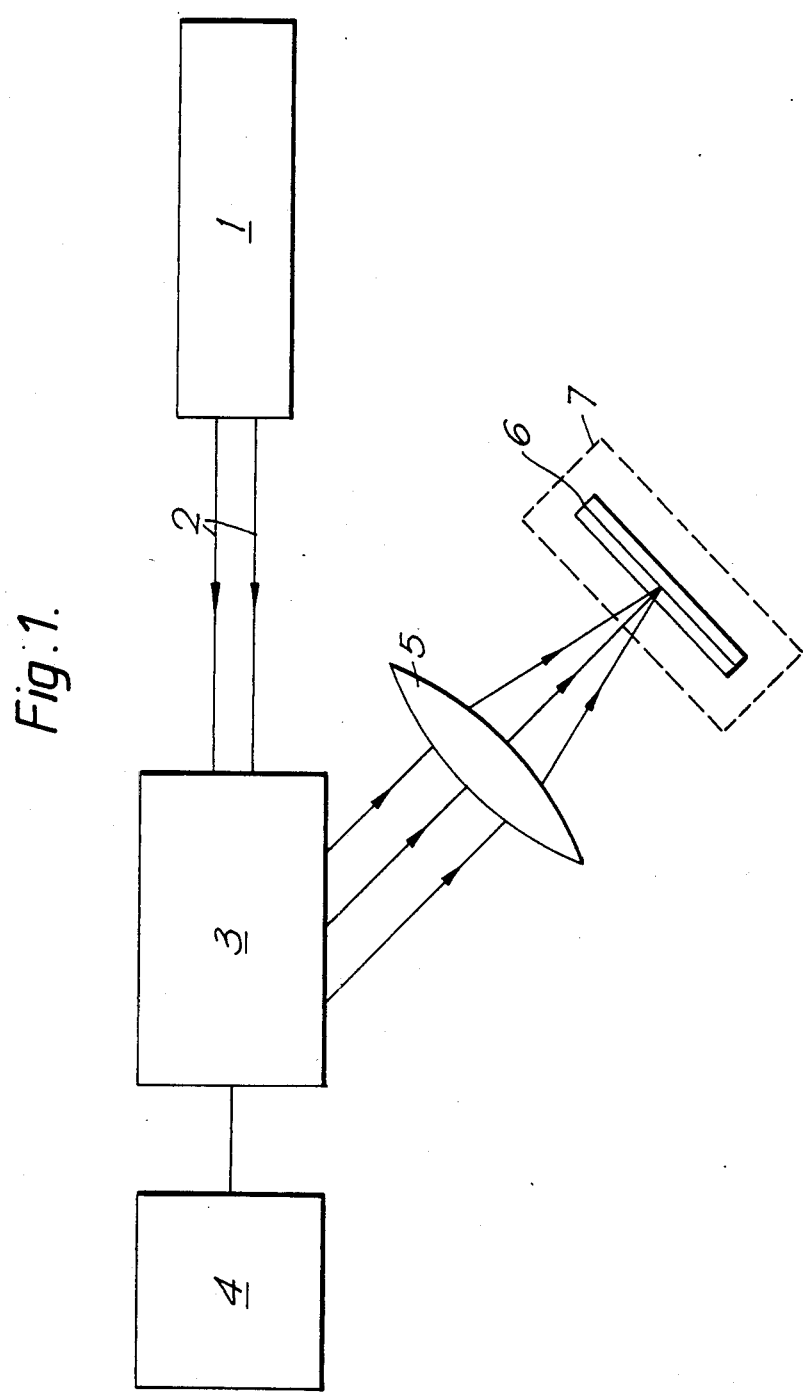
FIG. 1 diagrammatically illustrates the relationship of the integers of the device, FIG. 2 diagrammatically depicts the construction of the liquid crystal cell of the device in greater detail.

Referring to FIG. 1, a helium-neon laser 1 operating at 633 nm is positioned to direct its output beam 2 on to a deflecting mirror system 3 driven by associated control circuitry 4. Light reflected by the mirror system 3 is focussed by a lens 5 on to the surface of a liquid crystal cell 6 mounted in a chamber 7 with glass front and rear faces that is temperature stabilised by a flow through the chamber of warm nitrogen. The driving of mirror system 3 causes the focussed laser beam to scan over the liquid crystal layer.

Figure 2:
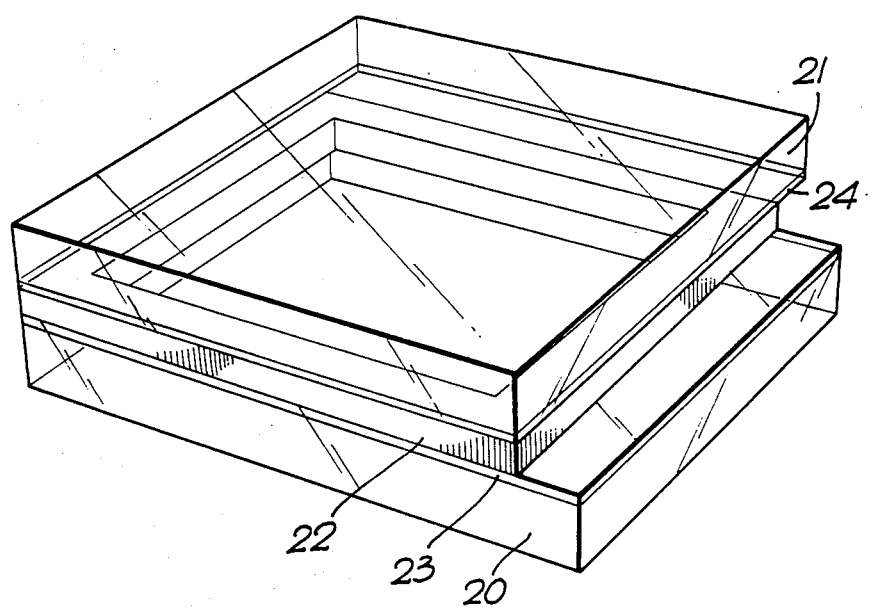

The cell 6 comprises two glass sheets 20, 21 (FIG. 2) secured together with a perimeter seal 22. The inward facing surfaces of the two sheets carry transparent electrode layers 23, 24 of indium tin oxide. The two sheets 20, 21 and the perimeter seal 22 co-operate to form a sealed envelope for the liquid crystal layer. The thickness of this layer is determined by the thickness of the perimeter seal, and control over the precision of this may be provided by a light scattering of short lengths of glass fibre (not shown) of uniform diameter distributed not only in the material of the perimeter seal but also in the area enclosed by it.

A preferred filling for the cell is the cyanobiphenyl smectic mixture marketed by BDH under the designation S4. To this is added a pleochroic dye that absorbs at the laser wavelength, and a dopant produce the requisite anisotropic conductivity for inducing dynamic scattering. Not only must the dye have an acceptable order parameter and have an absorption band in the appropriate part of the spectrum, but it must also be adequately soluble and reasonably inert in the presence of relatively strong light and strong electric fields and the sort of current densities encountered in dynamic scattering. Particularly suitable dyes for this purpose are the blue anthraquinone dyes alkyl 1, 4-diamino-anthraquinone-2 -carboxylates where the alkyl group contains between 1 and 20 carbon atoms. The use of such dyes in smectic displays is discussed in further detail in the specification of United Kingdom Patent Application No. 8416416 GB-A-No. 2160885 to which attention is directed. The guest-host mixture additionally contains a dopant to provide the requisite conductivity characteristics for it to be possible to induce electrohydrodynamic instability in the liquid crystal layer by using the electrodes to pass an electric current through its thickness. A suitable dopant for this purpose is a hexadecyltrimethylammonium salt. A typical formulation consists of S4 together with 2.0 weight % dye and 0.05 weight % hexadecyltrimethylammonium salt. Such salts have the additional property of acting as a surfactant that induces homeotropic alignment of the liquid crystal, and hence there is no absolute need to provide the inner walls of the cell with a surface alignment treatment such as plating them with tetranitro-μ-hydroxo-alkanoyldichromium III complex.

To operate the display device the display area of the liquid crystal cell is first set into a scattering state by the application of a unidirectional potential between its electrodes 23 and 24 to produce dynamic scattering. The potential is removed, whereupon the liquid crystal relaxes into a focal-conic scattering state. Typically scattering may be achieved using a 250 volts pulse of between 50 and 100 msec. duration. An alternating bias voltage is next applied between the electrodes. The amplitude of this bias voltage is less than a threshold value which on its own would be sufficient to cause the liquid crystal molecules to realign themselves into the optically non-scatting homeotropically aligned state. This threshold voltage is a function of temperature, and the effect of the laser beam heating is to provide a localised depression of the threshold voltage to a value beneath the bias voltage so that a scanning of the laser beam across the display area under the control of the deflecting mirror 3 causes the writing of a clear track. At some later point in time, when the display needs to be updated, it is prepared for the writing of a fresh page of information by removing the alternating bias voltage and reapplying the unidirectional voltage that produces dynamic scattering. Local erasure of already written lines or symbols may be achieved by retracing these lines or symbols with the laser, in the absence of the bias voltage, so that scattering is induced thermally. It is preferred to arrange for this unidirectional voltage to be applied in the opposite direction to that employed before the writing of the preceding page in order to oppose cumulative electrolytic degradation effects. Optionally the whole display area may be cleared immediately prior to reinducing dynamic scattering, this being achieved by temporarily increasing the amplitude of the bias voltage to an above-threshold value. The writing of a page will normally involve the writing of discontinuous tracks. Such discontinuities can be provided by temporarily removing the bias voltage while the laser beam is scanned from the end of one track to the beginning of the next. Alternatively the rate of movement of the beam can be temporarily increased so that, from the time it reaches the end of the first track to the time is reaches the beginning of the second, it is travelling so fast that insufficient heating of the cell occurs to produce any line-writing. As a further alternative some form of optical shutter (not shown) may be employed.

Figure 3:
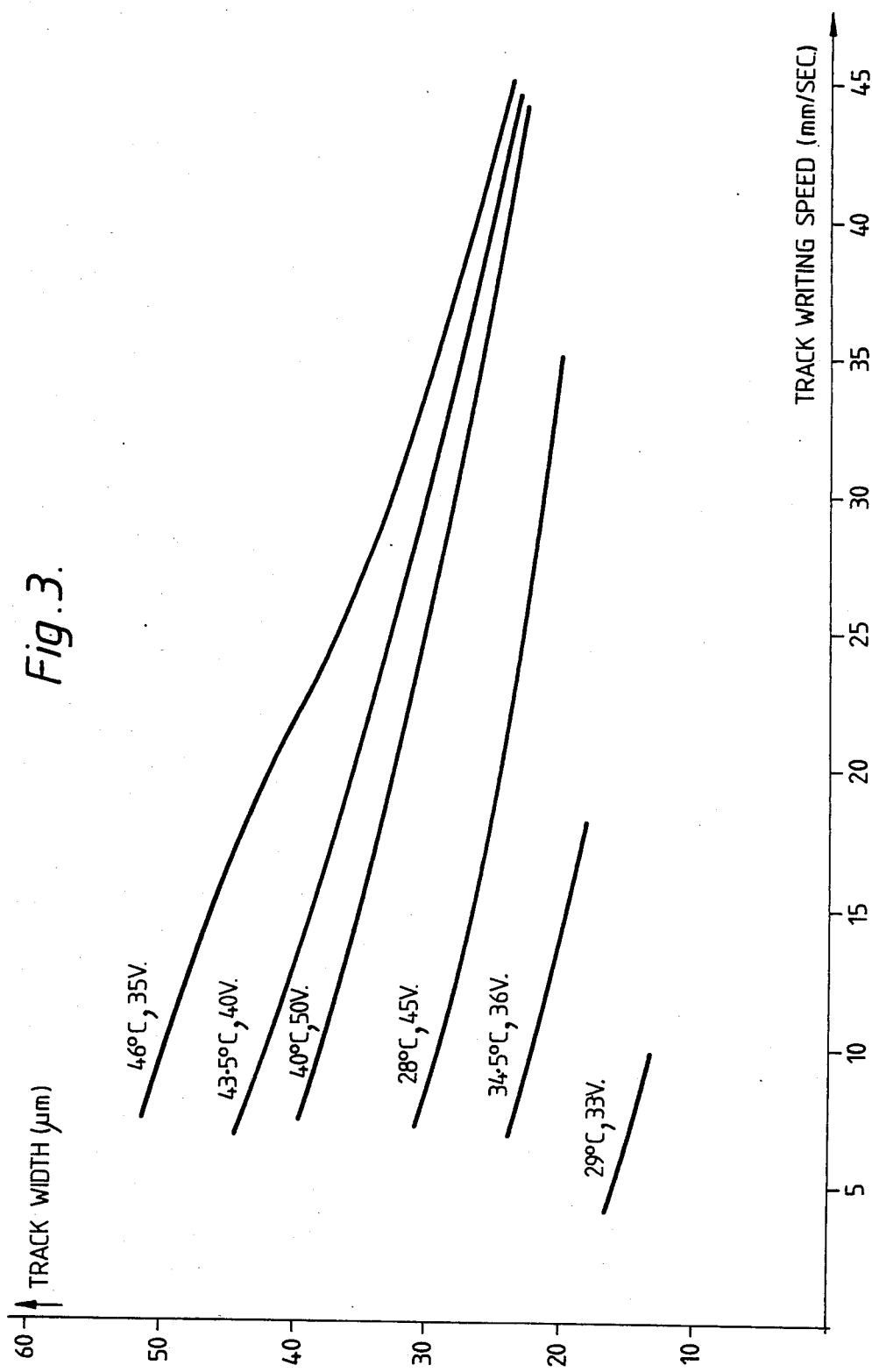
FIG. 3 is a graph illustrating how line width and writing speed are affected by temperature.

With a smectic, such as S4, whose smectic to nematic and nematic to isotropic phase transition temperatures are about 54° C. and 56° C. respectively, there is a distinct advantage in operating the cell at an elevated temperature, preferably just beneath the smectic to nematic phase transition, because this provides a faster track writing speed and a greater resolution. This is the reason for providing the temperature stabilised chamber for the cell. FIG. 3 shows, by way of example, how track width varies with track writing speed for a variety of temperatures and bias voltages at 2kHz. These results were obtained using a 12 micron thick layer of S4 incorporating 2 weight % of n-dodecyl 1, 4-diaminoanthraquinone-2 -carboxylate in conjunction with a helium neon laser with a nominal 5mW output focussed with a 25 mm diameter 50 mm focal length lens.

We claim:

1. A method of operating a laser beam scanned smectic cell to produce scattering texture data set against a substantially non-scattering clear background, wherein an entire area of the liquid crystal layer of the cell is 'erased' by setting it into a scattering state, and wherein data is subsequently entered on the erased area by the creation of substantially non-scattering clear regions produced by scanning the laser beam across selected portions of the erased area to produce localised heating into the isotropic phase by absorption of the laser light by a guest dye followed by rapid cooling characterised in that the setting into a scattering state is achieved by temporarily inducing dynamic scattering, and in that the rapid cooling is in the presence of an alternating electric field applied across the thickness of the layer that is too high in frequency to produce dynamic scattering and is insufficient in amplitude to switch regions of the area not subject to the laser beam induced thermal excursion.

2. A method as claimed in claim 1, wherein the cell is maintained an an elevated temperature.

* * * * *